June 11, 1963

H. TAX ET AL 3,093,091

VEHICLE FOR MOVEMENT ON CURVED TRACKS

Filed June 14, 1961

INVENTORS
Hans TAX
Herbert Biedermann

By *[signature]*
Agt

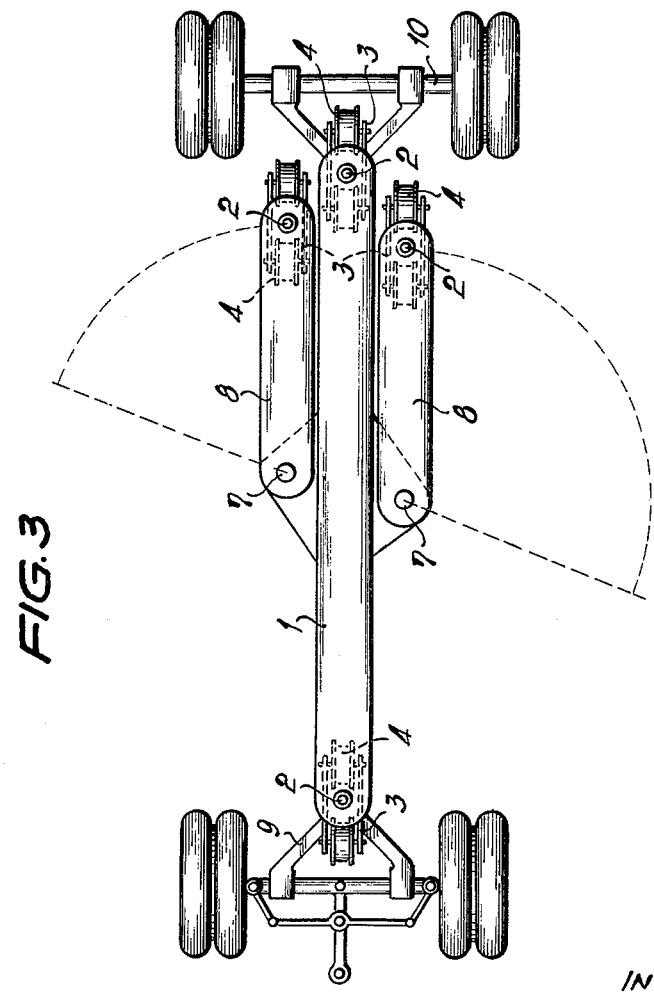

United States Patent Office 3,093,091
Patented June 11, 1963

3,093,091
VEHICLE FOR MOVEMENT ON CURVED TRACKS
Hans Tax and Herbert Biedermann, Munich, Germany;
said Biedermann assignor to said Tax
Filed June 14, 1961, Ser. No. 117,009
2 Claims. (Cl. 105—215)

This invention relates to vehicles adapted to move on sharply curved tracks, and is more particularly concerned with the vehicular base of a construction crane and the like which has to move about a construction site on tracks having very sharp curves.

Conventional vehicles traveling on railroad tracks where the minimum radius of curvature is of the order of one hundred times the track width may safely be equipped with wheels the axes of rotation of which are fixed with respect to the vehicle so that the wheel axes may not be precisely radially aligned when the vehicle travels through a curve. The tracking width of the vehicle under such conditions does not precisely agree with the spacing of the two rails which constitute the track, but the difference is slight, and may be neglected.

In vehicles which have to travel over sharply curved tracks it is advisable to connect the wheels to the vehicle frame in such a manner that the axes of rotation of the wheels may be radially aligned toward the center of track curvature. Such an alignment is indispensable when the radius of curvature of the track is of the same order of magnitude as the width of the track, that is, the lateral spacing of the rails from each other. With fixed wheel axes, the tracking width of the vehicle in such curves would be very substantially greater than the spacing of the rails.

This problem is not normally encountered in railroad practice, but it is important in the operation of construction cranes which are arranged to move about a construction site on sharply curved tracks.

It is the primary object of this invention to provide a vehicular support for a construction crane and the like which is adapted to move on two rails which are very sharply curved.

Another object of the invention is the provision of such a vehicular support which is dimensioned and arranged to permit movement of the crane from one construction site to another over public roadways and city streets.

A further object is the provision of a vehicular base which causes minimum wear of the curved track on which it travels, and of the vehicle wheels which engage the track.

With these and other objects in view, the vehicle of the invention has a frame member which is elongated in a direction obliquely inclined relative to the direction of elongation of the track so that the two free end portions of the frame member are respectively located above the two rails. Two side arms are pivoted to the center portion of the frame member and extend therefrom toward respective rails. Four pairs of wheels are respectively mounted on the free end portions of the frame member and on the free ends of the side arms in swivel mountings so that the wheels may independently follow their respective rails.

According to an additional feature of the invention, the frame member is equipped with detachable supplemental axles carrying additional wheels for movement of the vehicle, and of the crane mounted on it, over public roads.

Other features and many of the attendant advantages of this invention will be readily appreciated as the same becomes better understood by reference to the following detailed description of a preferred embodiment of the invention when considered in connection with the accompanying drawing wherein like reference numerals designate like parts throughout the figures thereof, and wherein:

FIG. 3 shows the apparatus of FIG. 1 in plan view as adapted for travel over public roads.

Figure 1:
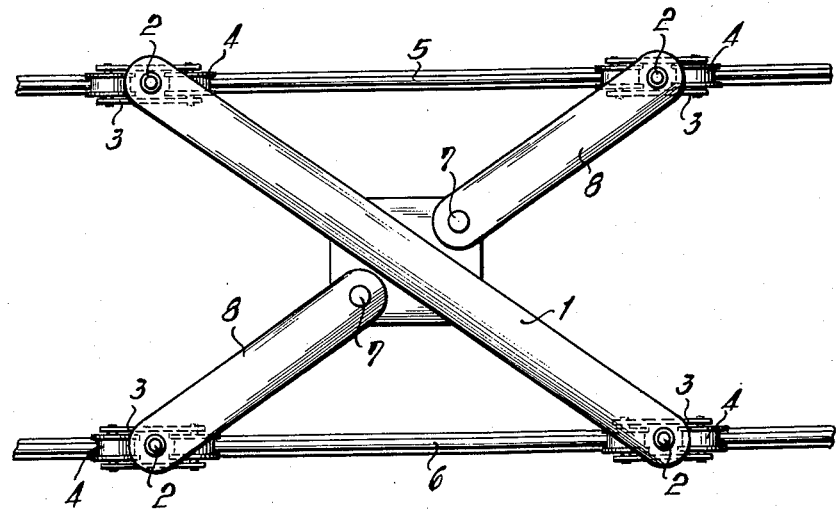
FIG. 1 shows the support vehicle for a construction crane of the invention in plan view.

Referring first to FIG. 1, there is seen the elongated main frame member 1 of the support vehicle for a construction crane or the like. Pivot pins 2 at the two ends of the elongated frame member 1 connect the same with wheel supports 3 each of which provides a swivel mounting for two wheels 4 arranged in tandem and equipped with double flanges which guide the wheels on the two rails 5, 6 respectively when the vehicle moves. Two side arms 8 are pivoted to the center portion of the frame member 1 by means of vertical pivot pins 7. The free ends of the arms 8 each carry an additional wheel support 3 with its wheels 4. The arm-carried wheel supports are also mounted for swivel movements. One of the arm-carried pair of wheels rolls on the rail 5, the other on the rail 6.

Figure 2:
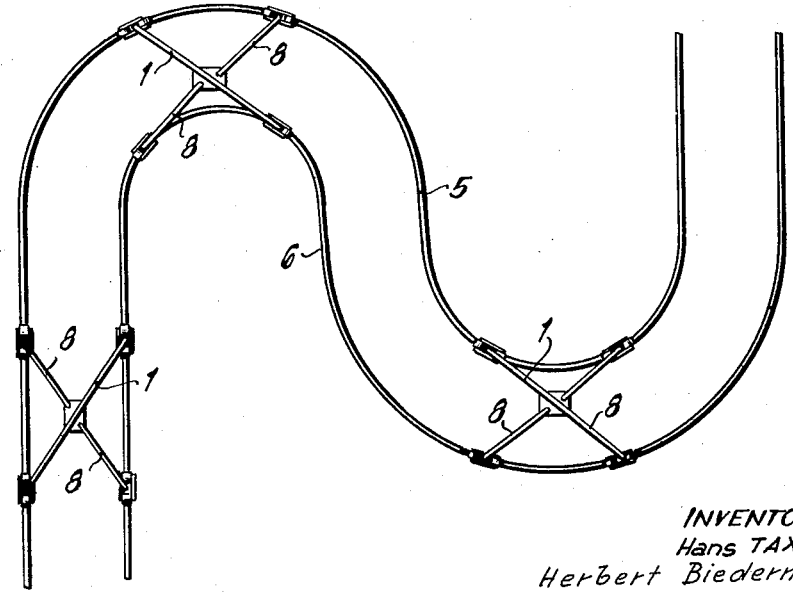
FIG. 2 illustrates a typical track for a construction crane, and the vehicle of FIG. 1 in several positions on the track, in a somewhat diagrammatic plan view on a reduced scale.

As seen in FIG. 2, the mounting of the wheels on individual wheel supports which are rotatable about vertical axes permits each wheel to follow the curvature of the rail on which it travels. The wheel axes are at all times precisely aligned with the radius of curvature of the rail. No transverse forces are exerted by the rails on the wheel flanges when the vehicle rounds a curve, and there is no undue wear of either the rail or the vehicle wheel.

The position of the vehicle, and thus of the crane, is at all times uniquely determined by the wheels on the rigid main frame member which are offset in the direction of vehicle travel. The wheels on the side arms 8 follow the rails and pivot the arms on their pins 7 as needed. The vehicle will therefore travel securely on tracks on which the spacing of the rails is not precisely uniform, a distinct advantage when operating on temporary construction tracks.

FIG. 3 shows the vehicle of FIG. 1 in condition for travel of the crane over public roads or through city streets where it is important that the vehicle require as little space as possible. A front axle assembly 9 with rubber tired wheels that can be steered, and a rear axle assembly 10 the wheels of which rotate about a fixed axis are respectively bolted to the free end of the main frame member 1. The height of the axle assemblies 9, 10 and of their wheels is such that the flanged track wheels 4 are elevated above the ground. The two arms 8 are pivoted toward the main frame member so that the overall width of the vehicle is substantially less than the width of the track on which it was shown traveling in FIG. 2.

The support vehicle of the invention is of utmost simplicity. Its working parts are sturdy and capable of withstanding the usual operating conditions of construction work. Yet, this simple vehicle structure has been found to be very stable. The wheels follow the curvature of the rails readily and without undue lateral friction. The rigid main frame carries a major portion of the weight of the crane. One or both of the wheels on the main frame member may be driven for travel of the cane under its own power. The driving energy is utilized in its entirety for acceleration of the vehicle without significant losses due to friction between the wheel flanges and the rail.

The independent pivotal attachement of the side arms permits the crane to travel over public roads while occupying a minimum of space. The transition from road travel to track travel is readily accomplished by driving the crane on its road wheels diagonally across the tracks, positioning the side arms, and then lowering the main frame on its flanged wheels. This feature is of substantial advantage when a crane has to be placed on its track at a construction site where space for elaborately maneuvering the crane into position on its tracks is not available.

Obviously many modifications and variations of the present invention are possible in the light of the above teachings. It is therefore to be understood that within the scope of the appended claims the invention may be practiced otherwise than as specifically disclosed.

What is claimed is:

1. In an undercarriage of a vehicle adapted to ride on rails,
   (a) an elongated member diagonally extending from rail to rail, said member having two free ends and two portions,
   (b) pivot means on said member intermediate said ends, each of said portions extending between said pivot means and one of said ends,
   (c) two arms, each arm having a free end and an end pivoted to said pivot means for movements in a normally horizontal plane, the pivot means being provided so as to allow each arm to be swung into a position closely alongside of either of said two portions,
   (d) four supports for wheels, each of said supports being carried at one of the four free ends of said member and arms and being rotatable about a normally vertical axis, so that the two arm-carried wheel supports will swing along with said arms when said arm-swinging is carried out, and
   (e) wheels carried by said supports for rolling engagement with rails.

2. In the undercarriage according to claim 1, means on said member for releasably securing at least a single axle thereto to extend transversely of the direction of elongation of said member, and road wheels on said axle.

References Cited in the file of this patent

UNITED STATES PATENTS

| | | |
|---|---|---|
| 90,513 | Eastman | May 25, 1869 |
| 2,800,086 | Wike | July 23, 1957 |
| 2,955,546 | Liebherr et al. | Oct. 11, 1960 |